Dec. 27, 1966  R. O. CHURCH  3,294,757
ADIABATIC, SOLID STATE POLYMERIZATION OF LACTAMS
Filed April 12, 1963
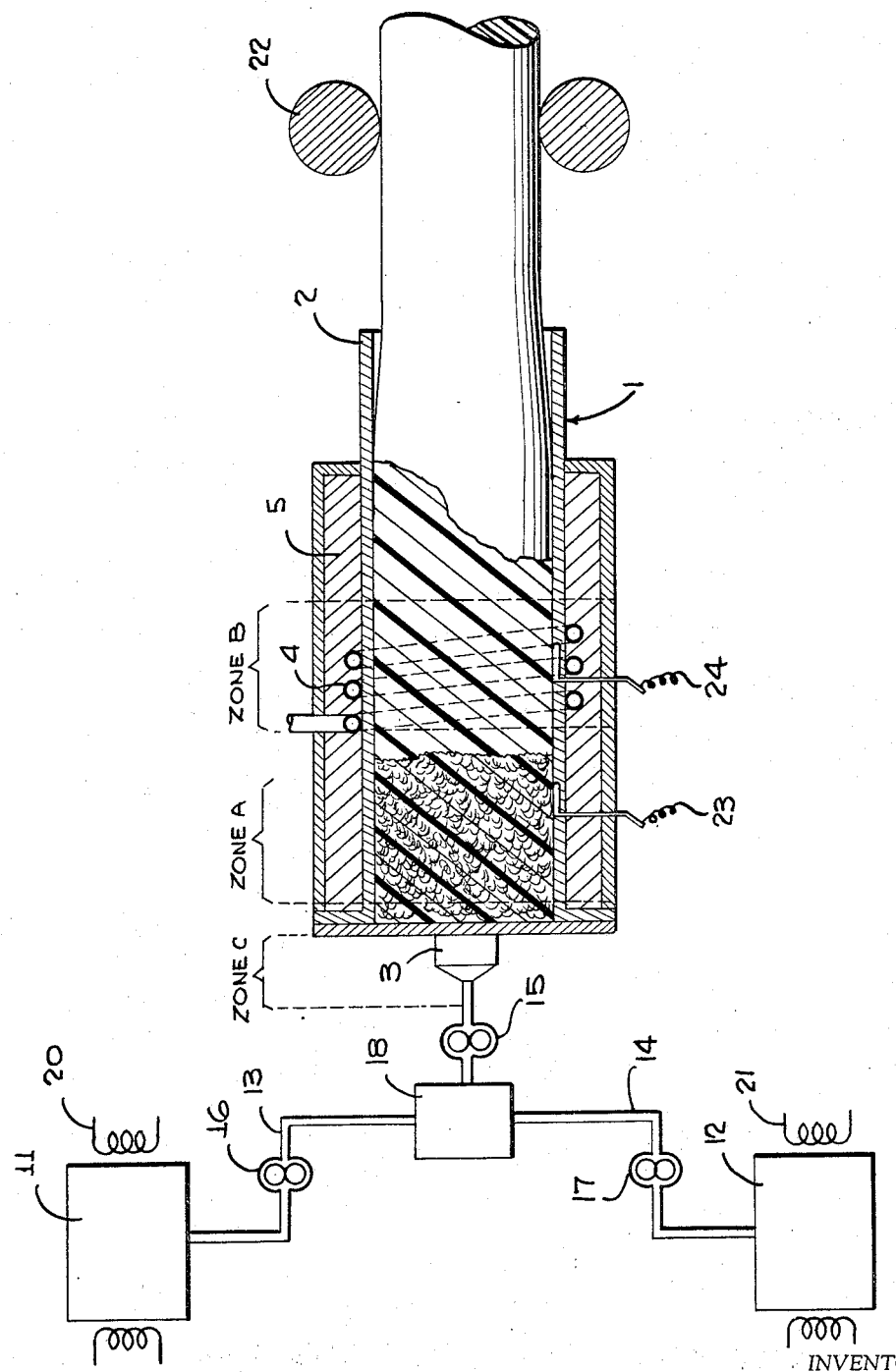
INVENTOR.
RICHARD O. CHURCH
BY *Richard O. Church*
ATTORNEY United States Patent Office 3,294,757
Patented Dec. 27, 1966

3,294,757
ADIABATIC, SOLID STATE POLYMERIZATION
OF LACTAMS
Richard O. Church, Wernersville, Pa., assignor, by mesne assignments, to The Polymer Corporation, a corporation of Pennsylvania
Filed Apr. 12, 1963, Ser. No. 272,786
6 Claims. (Cl. 260—78)

This invention relates to a process for the continuous polymerization of lactams simultaneously with the extrusion of polylactam shapes. More particularly, the invention deals with a method for continuously forming polylactams by advancing a column of material undergoing polymerization through an elongated forming tube while conducting the polymerization below the melting point of the polylactam.

Until recently, there has been no practical method by which the various polyamides could be polymerized beneath their melting points. Newly discovered processes have now made this possible with regard to higher lactams when used as the starting monomeric material.

The low temperature anionic polymerization of lactams referred to above is disclosed, for example, in U.S. Patents 3,015,652; 3,017,391; 3,017,392 and 3,018,273.

Briefly, the above patents disclose the novel polymerization of higher lactams, i.e., lactams containing at least 6 carbon atoms in the lactam ring, as for example, e-caprolactam, enantholactam, caprylactam, decanolactam, undecanolactam, dodecanolactam, pentadecanolactam, hexadecanolactam, methylcyclohexanone isoximes, cyclic hexamethylene adipamide, and the like, and mixtures thereof, in the presence of an anionic polymerization catalyst, as for example, alkali and alkaline earth metals such as lithium, sodium, potassium, magnesium, calcium, strontium, etc., either in metallic form or in the form of hydrides, borohydrides, oxides, hydroxides, carbonates, etc., organometallic derivatives of the foregoing metals, as well as other metals, such as butyl lithium, ethyl potassium, propyl sodium, phenyl sodium, triphenylmethyl sodium, diphenyl magnesium, diethyl zinc, triisopropyl aluminum, diisobutyl aluminum hydride, sodium amide, magnesium amide, magnesium anilide, Grignard reagent compounds, such as ethyl magnesium chloride, methyl magnesium bromide, phenyl magnesium bromide, and the like; and a promoter compound such as organic isocyanates, ketenes, acid chlorides, acid anhydrides, and N-substituted imide having the structural formula

wherein A is an acyl radical such as carbonyl, thiocarbonyl, sulfonyl, phosphinyl and thiophosphinyl radicals, B is an acyl radical of the group A and nitroso, R is a radical such as A, hydrocarbyl, and heterocyclic radicals and derivatives thereof, wherein said radicals in turn can contain radicals such as carbonyl, thiocarbonyl, sulfonyl, nitroso, phosphinyl, thiophosphinyl, tert.-amino, acylamido, N-substituted carbamyl, N-substituted carbamido, alkoxy, ether groups and the like, A and B, or A and R, together can form a ring system through a divalent linking group, and any free valence bond of the A and B radicals can be hydrogen or R, excepting A directly linked thereto, and the promoter compound preferably has a molecular weight of less than about 1000.

This polymerization of the higher lactams is initiated at temperatures of from about the melting point of the lactam monomer to about 250° C., and preferably from about 125° C. to about 200° C. As the reaction is exothermic, the initiation temperature will be exceeded under most conditions. The amount of catalyst and promoter compound each can vary from about 0.01 to about 20 mole percent, preferably from about 0.05 to about 5 mole percent, and more preferably still from about 0.1 to about 1 mole percent, all based on the higher lactam being polymerized. The higher lactams preferably contain from 6 to 20 carbon atoms and more preferably contain from 6 to 12 carbon atoms. The anionic catalyst preferably is a Grignard compound or an alkali metal and hydrides thereof. It will be understood that the anionic catalyst can be reacted in stoichiometric amount with a higher lactam to form a salt thereof, such as sodium caprolactam, and said salt can then be employed in the polymerization process in an equivalent amount to the anionic catalyst as set out hereinabove. This preliminary preparation is particularly desirable as it permits ready removal of hydrogen gas from the system as when sodium or sodium hydride is employed, removal of water as when sodium hydroxide is employed, removal of water and carbon dioxide as when sodium carbonate is employed, etc. Isocyanates and N-substituted imides are the preferred promoter compounds. It will be understood that the use of acid chlorides effects the presence of HCl in the system which preferably is removed therefrom to preclude reaction with the anionic catalyst, whereby extra catalyst would otherwise be required. Similarly, acid anhydrides generate organic organic acids in the system which then require sufficient anionic catalyst to neutralize the organic acid in addition to the amount desired to function in the polymerization reactions.

These new low temperature polymerization processes have made it possible to polymerize certain lactams within a mold cavity, and simultaneously form shapes therein without entering the melt phase of the resulting polymeric material.

Such polymerization molding, not only avoids many process steps of the prior art, e.g., initial polymerization, cooling, preparation of a molding powder, remelting of the polymer to permit formation, etc., but also facilitates ease in handling material and enables the production of articles having superior and more uniform physical properties.

As the molten phase of the polylactam is avoided, oxidative degradation is diminished and the need for high pressures in the molding process normally required to prevent shrinkage voids during solidification is greatly reduced.

Further benefits accrue from the utilization of these low temperature polymerization processes as a greater uniformity of desired crystallinity is achieved, improved control of the molecular weight is possible, and a higher conversion from monomer to polymer is obtained.

Accordingly, it is an object of this invention to provide methods and means for the polymerization of lactams with the simultaneous formation of continuous lengths of elongated shapes below the melting point of the resulting polylactams.

A further object of this invention is to provide a method for continuously polymerizing and simultaneously forming lactams by a method in which the heat of reaction is utilized, at least in part, to propagate the polymerization reaction.

A still further object of this invention is to provide a method for the continuous polymerization of lactams and simultaneous formation of polylactam articles wherein, once a thermal equilibrium has been reached, the heat of reaction is utilized to cause the polymerization to proceed substantially autogenously.

Yet another object of this invention is to provide a method for the continuous polymerization of lactams and simultaneous extrusion of polylactam articles wherein the necessity for heat transfer through the forming tube of the extruder to control the reaction is minimized or eliminated.

And yet another object of this invention is to prepare extruded articles of polylactams which have substantially uniform physical properties throughout their cross section.

These and other objects are achieved by heating a reactive mixture of lactams to a temperature approaching that at which polymerization rapidly will proceed; continuously introducing such reactive mixture into an elongated forming tube; initiating the polymerization of such reactive mixture by supplying heat to such mixture; and advancing such polymerizing mixture through such forming tube at a rate that will enable transfer of a sufficient portion of the heat of reaction to the reactive mixture being introduced into the forming tube to thermally initiate, at least in part, the polymerization of such incoming reactive mixture. Thus the heat of polymerization is utilized as a source of heat to increase the temperature of the incoming reactive mixture, at least in part, to polymerizing temperatures.

By these means the need for heating the reactive mixture to polymerization temperatures by heat transfer through the walls of the forming tube and the need for cooling the polymerizing mixture by heat transfer through the walls of the forming tube to dissipate the heat of reaction are greatly reduced and, accordingly, once equilibrium conditions have been established, the continuous polymerization will tend to be self-propagating. Not only is this advantageous for process purposes, but also the establishment of these conditions will enable the production of a polylactam article having a substantially uniform thermal history throughout its entire cross section no matter how large such cross section may be. This results from the fact that a given cross section of the article will be uniformly cooled by axial heat transfer to the incoming reactive mixture rather than radially through the side walls of the forming tube.

The accompanying drawing discloses an extrusion apparatus for forming solid palylactam shapes in accordance with this invention wherein there is schematically illustrated a forming tube 1 having an exit end 2 and an entrance end 3. The forming tube 1 may be comprised of polytetrafluoroethylene although other materials can be used. Polytetrafluoroethylene is preferred for its low coefficient of heat transfer and its low coefficient of friction.

Surrounding the forming tube 1 is a heat exchanger 4, which is schematically shown as coils in which a heat exchange liquid may be circulated. However, other devices such as electric strip heaters can be used. An insulation jacket 5 may be provided surrounding forming tube 1 and thermocouples may be provided as at 23 and 24.

Storage tanks 11 and 12 are provided which communicate via conduits 13 and 14 and pumps 16 and 17, respectively, to a mixing device 18.

Heat exchange means 20 and 21 are positioned in heat exchange relationship with the tanks 11 and 12. While not so shown in the drawing, lagging or other insulating material can be used to surround tanks 11 and 12, conduits 13 and 14, pumps 15, 16 and 17, and mixing device 18.

Metering pumps 16 and 17 may be of conventional type that preferably will serve both to meter the flow of liquids therethrough and to develop such pressures as may be necessary for optimum functioning of the system. Gear type pumps are satisfactory in this regard. A gear type pump 15 is also preferred at the entrance end 3 of forming tube 1.

Mixing device 18, which is sometimes desirable but not necessary in the practice of this invention, may be a chamber with agitation means disposed therein or can be comprised of mixing nozzles utilized to discharge material from conduits 13 and 14 and cause intimate contact and mixing between the two discharging streams.

In operation, liquid lactam monomer or mixtures of lactam monomers, prereacted with or containing a suitable catalyst, is fed from storage tank 11 via conduit 13 and metering pump 16 into device 18. A quantity of monomer containing a proper portion of promoter (initiator) material is also introduced into mixing device 18 from holding tank 12 via conduit 14 and metering pump 17. The temperature of the material within holding tanks 11 and 12 is adjusted to be above the melting point of the monomer.

To obtain the correct proportions of monomer, catalyst, and promoter (initiator), it is generally preferred to provide somewhat equal quantities of initiated monomer and catalyzed monomer from the tanks 11 and 12. This is not critical, however, and it is within the scope of this invention to feed a stream of initiated monomer from one tank to another stream comprised only of catalyst concentrate from the other tank. Since the initiator and catalyst concentrations are quite low in relation to the monomer concentration, more homogenous mixing can be achieved if the catalyst and initiator are first thoroughly dispersed throughout aliquot portions of the monomer and then fed as substantially equivalent stream to the mixing device 18.

The temperature of the reactive mixture entering forming tube 1 is adjusted (as at Zone C) to be slightly below but approaching the temperature at which the polymerization reaction will proceed with rapidity. When this mixture enters forming tube 1 and is advanced into Zone B, heat is supplied by heat exchange means 4 to raise the temperature of the reactive mixture to a point whereat polymerization rapidly will proceed. As the polymerization proceeds, a substantial exotherm is observed and the supply of additional heat in Zone B by heat exchange means 4 is discontinued. Thereafter this heat of reaction is utilized to raise the temperature of the advancing column of reactive mixture within Zone A to polymerizing temperatures by controlling the rate of advancement. This rate of advance is adjusted (by pump 15) to enable sufficient heat transfer from the polymerizing material in Zone B to initiate thermally the material in the boundary zone between Zone A and Zone B. By these means, the reaction becomes self-propagating and, in a sense, proceeds autogenously without heat being added to or withdrawn from Zones A and B, that is, the reaction is conducted under substantially adiabatic conditions. It can readily be understood that the heat of reaction will be transferred in an axial direction uniformly throughout the cross section of the article. By dissipating the heat of reaction in this manner, in distinction to transferring such heat radially through the side walls of the forming tube, the entire cross section of the article can be controlled uniformly to the same temperature both at the time the reaction is thermally initiated and during the time the polymerization is actively proceeding.

In contrast to the above process, a uniform temperature throughout a cross section of the article cannot be obtained if temperature control through the side walls of the forming tube is relied upon. Indeed, due to the comparatively low coefficient of thermal transfer of lactams and polylactams, dependency on radial heat transfer during polymerization may result in a temperature rise at the inner portions of articles of substantial cross sections sufficient to cause the melting point of the polylactam to be exceeded. This not only will prevent the formation of an article having uniform crystallinity throughout, but also will encourage the formation of shrinkage voids upon solidification of the molten polylactam.

Thermocouples 23 and 24 are provided to sense the temperatures within Zones A and B and accordingly adjust the speed of gear pump 15, preferably by any known automatic means, not shown. If the temperature in Zone A increases toward rapid polymerization temperatures, the speed of advancement is increased and if the temperatures in Zone B tend to fall below rapid polymerization temperatures, the speed of advancement is decreased. The speed of draw-off rolls 22 can also be adjusted, as may be necessary, either to supply a braking force or to diminish back forces on the system.

In a somewhat simplified embodiment of this invention, only a single holding tank is provided for a fully reactive mixture of the lactam monomer and is fed therefrom to the entrance 3 of the forming tube 1 via a heat exchanger that raises the temperature of the reactive mixture to the desired temperature approaching rapid reaction temperatures. If this method is used, however, care must be taken to insure that the reactive mixture is not stored for prolonged periods in the single holding tank or else premature reaction may take place even at comparatively low temperature.

As is conventional in other extrusion processes, it is advantageous to provide a movable cylindrical plug within the forming tube during initial startup of this process. The plug will provide a dam to prevent the reactive mixture from flowing out of the forming tube until polymerization conditions are established and, thereafter, will be advanced by the polymerized material axially through and out of the forming tube.

*Example*

A 1/50 molar quantity of sodium hydride was reacted with epsilon caprolactam and placed in holding vessel 11 and a 1/50 molar quantity of tolylene diisocyanate was mixed with another portion of epsilon-caprolactam and placed in holding vessel 12. Both holding tanks were heated to a temperature of about 90° C. The catalyzed monomer was introduced into mixing vessel 18 via conduit 13 and pump means 16 and the initiated monomer was introduced into mixing vessel 18 via conduit 14 and pump means 17. The reactive mixture was raised to a temperature of about 120° C. and introduced into Zone A of the forming tube 1 via pump means 15. A polytetrafluoroethylene plug was inserted into Zone B of the forming tube 1 to prevent the escape of the liquid reactive mixture. When both Zone A and B had been filled with the reactive mixture, the pump 15 was stopped and heat was supplied to Zone B by heat exchange means 4 until thermocouple 24 indicated a temperature of about 155° C. At this time, the supply of heat to Zone B was discontinued.

The temperature indicated by thermocouple 24 then rapidly increased to about 190° C. due to the exotherm of the reaction and, at this time, pump 15 was again started to introduce a continuous supply of reactive mixture whose temperature was adjusted to about 125° C. The speed of advancement of the mixture in Zones A and B was then adjusted to be sufficiently slow to enable thermal initiation of the reactive mixture entering Zone B but sufficiently rapid to prevent premature reaction of the mixture in Zone A. When equilibrium conditions were obtained, thermocouple 23 indicated a temperature of about 130° C. and thermocouple 24 a temperature of about 190° C. Thereafter the speed of advancement was controlled by pump means 15 and draw-off rolls 22 in a manner that would increase the speed if thermocouple 23 indicated a temperature above about 130° C. and would decrease the speed if thermocouple 24 indicated a temperature below about 190° C. Alternatively, speed control can be established by reference to only one thermocouple, as, for example, the speed would be increased or decreased depending on whether thermocouple 23 indicated a temperature above or below, respectively, 130° C.

I claim:
1. An autogenous and substantially adiabatic process for the continuous conversion of a higher lactam into an elongated, substantially uniform cross sectioned shape of polylactam by utilizing low temperature anionic polymerization processes conducted below the melting point of the polylactam shape comprising the steps of:
 (1) continuously introducing into a first zone of a forming tube a polymerizable mixture comprised of a higher lactam and a catalyst and a promoter for the low temperature anionic polymerization thereof while said mixture is heated above the melting point of said higher lactam but below the temperature at which the rapid polymerization of said lactam will be initiated;
 (2) continuously advancing said polymerizable mixture from said first zone to a second zone within said forming tube;
 (3) initially heating a portion of said polymerizable mixture to a temperature that will initiate the rapid polymerization of said portion and then discontinuing said heating;
 (4) controlling the speed of advance of said polymerizing mixture through said forming tube to be sufficient to prevent the rapid polymerization of said reactive mixture from taking place in said first zone and to be slow enough to insure the substantial completion of said polymerization in said second zone; and
 (5) discharging said shape of polylactam from said forming tube.

2. A method according to claim 1 in which said speed of advance is controlled, at least in part, by the rate at which said polymerizable mixture is introduced into said first zone.

3. A method according to claim 1 in which said speed of advance is controlled, at least in part, by draw-off rolls.

4. A method according to claim 2 in which temperature-sensitive means are positioned within said first zone and the rate at which said polymerizable mixture is introduced into said first zone is responsive thereto.

5. A method according to claim 2 in which temperature-sensitive means are positioned within said second zone and the rate at which said polymerizable mixture is introduced into said second zone is responsive thereto.

6. A method according to claim 1 in which the temperature of said first zone is maintained in a range of from about 130° C. to about 155° C., and the temperature of said second zone is maintained in a range of from about 155° C. to about 190° C.

References Cited by the Examiner

UNITED STATES PATENTS

| | | | |
|---|---|---|---|
| 3,017,391 | 1/1962 | Mottus et al. | 260—78 |
| 3,028,369 | 4/1962 | Butler et al. | 260—78 |
| 3,047,541 | 7/1962 | Ryffel et al. | 260—78 |
| 3,166,533 | 1/1965 | Wichterle et al. | 260—78 |
| 3,200,095 | 8/1965 | Wichterle et al. | 260—78 |
| 3,214,414 | 10/1965 | Waltersperger | 260—78 |

OTHER REFERENCES

Mark et al.: Physical Chemistry of High Polymeric Systems, Interscience, 1950, New York, pp. 357 to 359 and 363 relied on. QD281, p. 6 M35p.

Tobolsky: Properties and Structure of Polymers, 1960, John Wiley & Sons, New York, QD471, T7, p. 198.

WILLIAM H. SHORT, *Primary Examiner.*

H. D. ANDERSON, *Assistant Examiner.*